Feb. 17, 1925.
P. KAMINSKI
1,526,551
APPARATUS FOR DETERMINING THE MOTION OF AN OBJECT FROM A MOVING PLATFORM
Filed Feb. 8, 1924
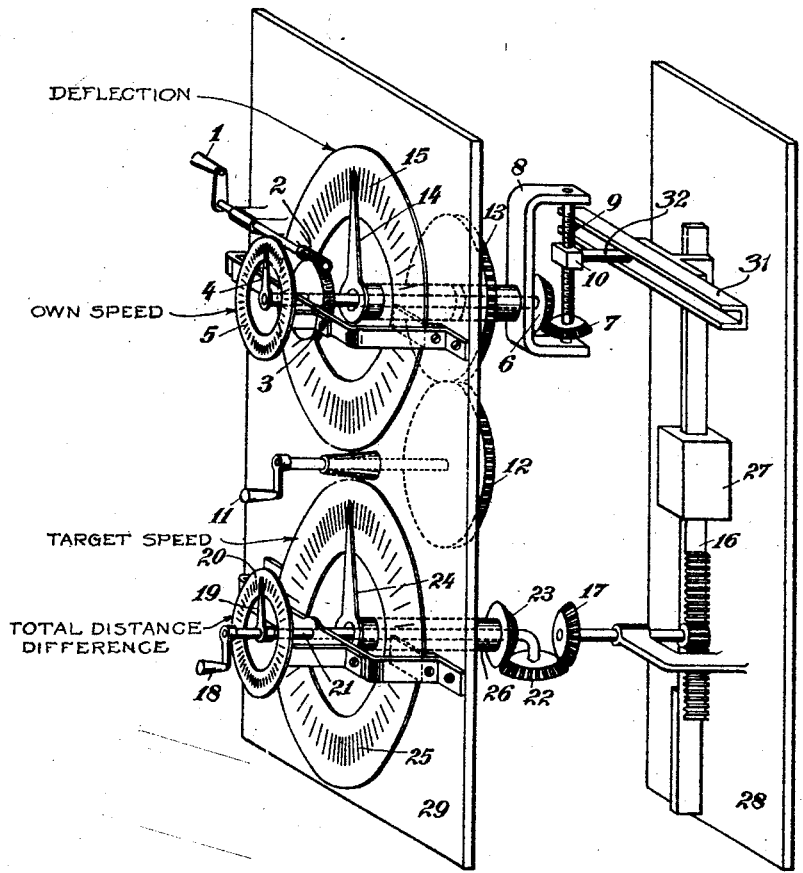

Patented Feb. 17, 1925.

1,526,551

UNITED STATES PATENT OFFICE.

PAUL KAMINSKI, OF BERLIN-PANKOW, GERMANY, ASSIGNOR TO SIEMENS & HALSKE, AKTIENGESELLSCHAFT, OF SIEMENSSTADT, NEAR BERLIN, GERMANY, A GERMAN CORPORATION.

APPARATUS FOR DETERMINING THE MOTION OF AN OBJECT FROM A MOVING PLATFORM.

Application filed February 8, 1924. Serial No. 691,460.

*To all whom it may concern:*

Be it known that I, PAUL KAMINSKI, a citizen of the German Empire, residing at Berlin-Pankow, Germany, have invented certain new and useful Improvements in Apparatus for Determining the Motion of an Object from a Moving Platform, of which the following is a specification.

My invention relates to improvements in apparatus for determining the motion of an object from a moving platform.

Apparatus for determining the approach velocities of moving objects or the so-called distance difference in a unit of time are already known. If such a determination takes place from a platform, which itself is in motion, for instance a ship, the value indicated by the apparatus includes also the own motion of this platform. For certain purposes it is, however, necessary, to ascertain the motion of the other part only, for instance that of a target, the enemy or any other object, i. e. to determine that portion of the total distance difference which is caused by the motion of the target or the like only.

The total distance difference $d$ in a unit of time, for instance in a minute is $d-a\pm b$ cosine $\alpha$. In this formula $a$ is the velocity of approach or recession of the object observed, $b$ the own velocity of the moving platform of the ship in the unit of time and $\alpha$ the angle which the line of sight forms with the direction of motion of the platform or the course of the ship.

The value $a$ to be determined is thus $a-d\pm b$ cosine $\alpha$. It is somewhat difficult by consideration and calculation to combine the several values in the proper sense into a single resultant value.

The invention relates to an apparatus, which renders all calculations unnecessary and which by simple adjustment of the known values gives the desired value of the motion of the target or the like in the proper sense. This object is attained according to the present invention by the aid of an epicyclic or planet wheel gear, whose first driving wheel is adjusted in correspondence with the own motion of the platform and whose pinion or planet wheel is adjusted in correspondence with the total distance difference, so that the other free wheel of the gear performs a motion corresponding with the difference of the two before mentioned values. This motion may be read off on a scale calibrated according to the "motion of the target in the unit of time". The operation of the device must, however, not take place in the customary manner, as an epicyclic or planet gear generally adds in the direction of rotation and subtracts in the opposite direction. In the present problem the "total distance difference" ascertained represents, however, always the total which is to be divided into two portions. Taking the signs of the above formula into consideration, the total distance difference must therefore be adjusted on the pinion or revolving planet wheel. The free bevel wheel, the "sun" of the planet gearing then gives the correct motion of the target in regard to the sign.

In the accompanying drawing one embodiment of my invention is shown by way of example. The improved apparatus is shown in a perspective view.

Referring to the drawing 1 is a crank by means of which the pointer 4 is first adjusted upon the dial 5 calibrated for instance according to "own travel in meters per minute" by means of the worm gear 2, 3. Simultaneously the spindle 9 journaled in the frame 8 is rotated across the bevel wheels 6, 7, so that the nut 10 moves along the screw spindle 9. Then the pointer 14 is adjusted upon the dial 15 calibrated according to "deflection" by means of the crank 11 and the gearing 12, 13. Hereby the frame 8 is simultaneously turned. The nut 10 is thus radially moved in correspondence with the value of the own travel and turned in correspondence with the deflection. This motion is multiplied in known manner with the cosine value by the sine link 16, whose upper horizontal portion 31 slidingly engages a detent 32 of nut 10, and which itself is slidably mounted in a guide 27, and the resulting motion is transmitted to the driving wheel 17 of the epicyclic gear. The motion of the wheel 17 thus represents the value $b$ cosine $\alpha$. Finally the pointer 19 is adjusted by the crank 18 upon the dial 20 calibrated in accordance with the total distance difference per minute and corresponding with the value $d$ and hereby the pinion or planet wheel 22 fixed upon the spindle 21 is revolved. As thus the motion of the pinion or planet wheel 22 represents the total distance difference and the motion of the wheel 17 the own rate of travel along the line of sight, the pinion or planet wheel 23 will represent the difference of these two values, that means the motion of the target or the like desired to be ascertained. The adjustment of the free driven wheel 23 is transmitted by the tubular shaft 26 revolving around the spindle 21 to the pointer 24, which moves in front of a dial 25 calibrated in correspondence with the "motion of the object" and thus with the value $a$.

As the revolving pinion or planet wheel 22 transmits its motion on half scale, it is preferable to inset a 1 : 2 gear between the shaft 21 and the pointer 19, in order to obtain the indications on the dial 20 in the angular scale of the other dials. It is, furthermore, advisable to provide a notch or other suitable arresting device for the shaft 21, so that an adjustment of the cranks 1 and 11 does not affect the crank 18 and the pointer 19, but is only transmitted to the pointer 24.

For remote indication of the motion of the object or target, the pointer 24 or its tubular shaft 26 may be connected with an electric remote adjustment transmitting system of any suitable kind. The gearing is housed and journaled in a casing 28 with cover 29.

It will be readily understood that I do not limit myself to the exact construction of the apparatus as illustrated, but that modifications will easily suggest themselves to those skilled in the art.

What I claim as my invention and desire to secure by Letters Patent is:—

1. In apparatus for determining on board a moving platform that part of the rate of total change of range, which is caused by the motion of an object, with the aid of three different exactly predeterminable values, in combination a multiplying device comprising two adjustable elements and a third freely movable element, means for adjusting one of the two adjustable elements of said device in correspondence with the velocity of the platform, means for adjusting the other of the two adjustable elements of said device according to the angle between the line of sight and the course of the platform, an epicyclic gear consisting of an adjustable planetary pinion, an adjustable driving wheel and a freely driven wheel, means for connecting the third element of said multiplying device to the adjustable driving wheel of said epicyclic gear, means adapted to adjust the planetary pinion of said epicyclic gear in correspondence with the rate of total change of range, an indicating device and means for connecting the free driven wheel of said planetary gear to said indicating device.

2. In apparatus for determining on board a moving platform that part of the rate of total change of range, which is caused by the motion of an object with the aid of three different exactly predeterminable values, in combination a multiplying device comprising a rotatable yoke, a screw-thread spindle rotatably mounted within the yoke and a nut slidably disposed on the spindle, means for rotating the spindle of said device in correspondence with the velocity of the platform, means for rotating the yoke of said device according to the angle between the line of sight and the course of the platform, an epicyclic gear consisting of an adjustable planetary pinion, an adjustable driving wheel and a freely driven wheel, means for connecting the nut of said multiplying device to the adjustable driving wheel of said planetary gear, means adapted to adjust the planetary pinion of said epicyclic gear in correspondence with the rate of total change of range, an indicating device and means for connecting the free driven wheel of said planetary gear to said indicating device.

In testimony whereof I affix my signature.

PAUL KAMINSKI.